Patented Jan. 15, 1929.

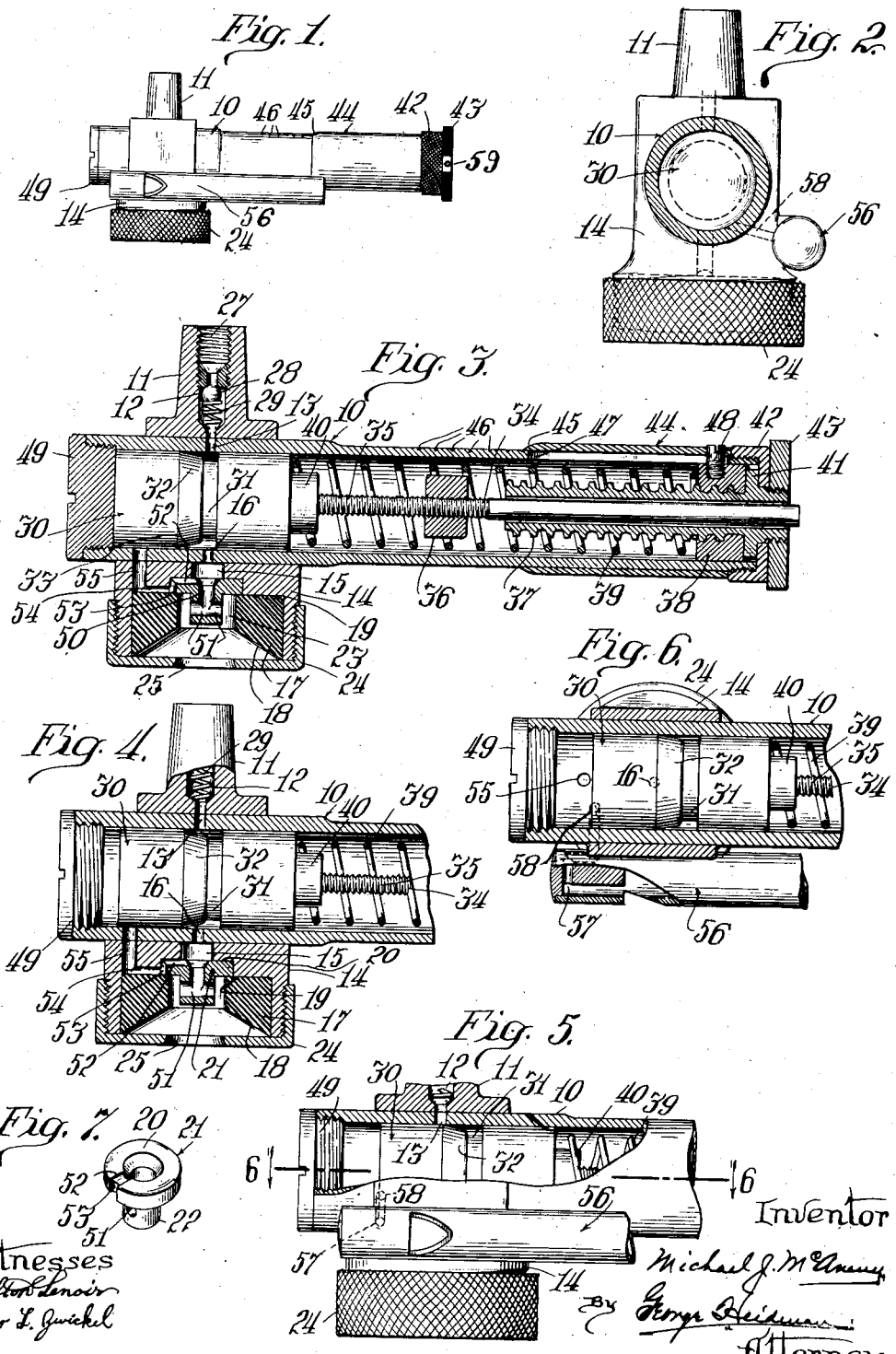

1,698,956

UNITED STATES PATENT OFFICE.

MICHAEL J. McANENY, OF DENVER, COLORADO, ASSIGNOR TO JAMES L. GORER, OF DENVER, COLORADO.

TIRE-INFLATING AIR-PRESSURE CONTROLLER.

Application filed March 11, 1927. Serial No. 174,460.

My invention relates to a device more especially intended for use in inflating pneumatic tires whereby the amount of air pressure introduced may be regulated or controlled and whereby the operator will be audibly informed when the predetermined air pressure has been introduced into the tire or other element.

My invention has for its object the provision of a construction whereby a feeding of the air from the source of air supply under pressure will be automatically controlled or regulated in keeping with the speed at which such air may be introduced into the tire to be inflated and escape or "bleeding" of the supply or of the tire prevented; the device involving a construction wherein the air passage intermediate of the inlet and main outlet of the device is controlled by means adapted to automatically operate after the preselected air pressure, for which the device has been adjusted, has been introduced into the tire or other element to be inflated.

The objects and advantages of my device will be more readily comprehended from the detailed description of the accompanying drawing, wherein—

Figure 1 is a side elevation of my improved device.

Figure 2 is an enlarged end view with a portion broken away and shown in section.

Figure 3 is an enlarged longitudinal sectional view of the device.

Figure 4 is an enlarged sectional view of the piston and air port end of the device, showing an advanced position of the piston.

Figure 5 is a partial sectional and plan view of the end of the device shown in Figure 4, the section being taken just beneath the inlet nipple and discloses a further advanced position of the piston.

Figure 6 is a longitudinal sectional view taken substantially on the line 6—6 of Figure 5 with certain portions broken away and shown in section.

Figure 7 is an enlarged detail view in perspective of the tire-valve controlling member.

The invention in its specific embodiment comprises a cylindrical casing 10 of suitable dimensions, provided adjacent one end with a nipple 11 having an air-duct or passage 12 extending therethrough, which communicates with a port 13 in the casing 10. The casing 10, at a diametrically opposite point, is shown provided with a nozzle or tire valve-stem receiving portion 14 having an air duct 15 which communicates with an air port 16 in the shell or casing 10. The nozzle portion 14 is counterbored to receive a suitable gasket 17 having a dished face 18 on the outer side; while the opposite or inner flat side of the gasket is intended to lie flush with the surface 19 of the nozzle portion. This surface 19 of the nozzle portion is provided with a small counterbore about the duct 15 to receive the base or annular flange portion 20 of the tire-valve controlling element 21 which is held in place by the gasket 17 shown lapping the flange 20. This element 21 has a short stem or teat 22 which extends into the central opening 23 of the gasket; the opening 23, as can clearly be seen in Figure 3, being larger in diameter than the teat portion 22 so as to provide a free air passage thereabout. The gasket 17 fits snugly into the counterbore of the nozzle 14 and is further held in place by the cap member 24 shown preferably threaded onto the nozzle 14; the cap member in turn being provided centrally with a suitable opening 25 to receive the stem of the tire-valve (not shown).

In the specific disclosure, I show the outer end of the duct 12 in the nipple 11 threaded at 27 for suitable connection with a tube leading from the supply of air under pressure; while the inner end is formed to provide a seat for a suitable check valve 28 normally held to its seat by spring 29; the check valve preventing escape of the air pressure from the tire when the supply hose is uncoupled from the nipple 11.

The casing 10 is provided with a piston 30 of predetermined length and this piston at an intermediate point is provided with a circumferential groove or duct 31 which normally is in full register with the ports 13 and 16 located at diametrically opposite points in the casing 10. The piston 30, at one side of the circumferential groove, is provided with a circumferential bevel 32, whereby this portion of the piston tapers toward the circumferential groove 31, thereby providing an air passage circumferentially about the piston, which gradually decreases in depth until it reaches the point 33 or main perimeter of the piston which is in close sliding contact with the inner wall of the casing 10.

One end of the piston 30 is provided with a stem or rod 34 adapted to extend slightly beyond the opposite end of the cylinder or casing 10; the rod being preferably shown threaded at 35 to receive a stop-collar or member 36 and permit adjustment of the latter lengthwise of the rod whereby too far inward movement of the piston is prevented and therefore maximum movement determined. The rod 34 passes through an elongated ferrule or screw member 37 in free sliding relation therewith; and the ferrule member 37 is externally threaded to receive the nut 38 which provides a seat for one end of the coil spring 39. The other end of the spring 39 seats about the reduced portion or boss 40 at the inner end of the piston 30. The ferrule member 37, adjacent to its outer end, is flanged at 41 to be engaged by the screw cap 42 threaded onto the adjacent end of the cylinder or casing 10; the screw cap 42 permitting the end of the ferrule or screw member 37 to extend therethrough and have free rotary movement. The outer end of the ferrule member is shown provided with knurled finger grasping member 43, which in turn has an opening for passage of the end of the stem 34 therethrough.

A sleeve 44 is slidably mounted on the casing 10, with one end preferably tapered as shown at 45 to clearly define the position of the end of the sleeve 44 relative to indicating marks or graduations shown at 46 on the cylinder or casing 10; the graduations being suitably spaced to indicate different degrees of pressure, say from 20 to 60 pounds. The cylinder 10 is provided with an elongated slot 47 to permit passage of set-screw 48 therethrough; the set-screw operatively connecting the sleeve 44 to the riding nut 38, so that rotation of the screw 37, through the medium of the finger grasping member 43, will cause sleeve 44 to move lengthwise of cylinder 10 in keeping with the movement of nut 38 lengthwise of the screw 37, and thereby also increasing the pressure of spring 39 on the piston 30.

The opposite end of the cylinder 10 is provided with a screw-plug 49 which closes said end of the cylinder; the screw-plug normally being in abutting relation with the adjacent end of the piston 30 so that movement of the piston from its normal operative position, as indicated in Figure 3, namely to the left in Figure 3, cannot take place. As a result, a complete registering of the circumferential groove 31 with the air ports 13 and 16 in the cylinder or casing 10 will be ensured while the piston is in its normal position, induced by the constant, although varying, pressure exerted by spring 39.

The flange portion 20 of the tire valve controlling member 21 is counterbored at 50, extending partially into the teat 22 to provide an air passage or duct which terminates in oppositely disposed ports 51 in the sides of the teat portion 22. The flange portion 20 of member 21 is shown provided with a transverse groove 52 radiating from the counterbore or opening 50 and this groove communicates with the notch or groove 53 formed in the perimeter of the flange 20, see Figure 7. The gasket receiving face 19 of the nozzle 14 is provided with a groove 54 intended to register with the groove 53; and the groove 54 communicates with a port 55 which leads into the cylinder 10.

One side of the nozzle 14 is provided with a tubular alarm sounding element or whistle 56, one end whereof has a port 57 which communicates with the interior of the cylinder 10 by means of the port shown in dotted lines at 58 in Figures 2, 5 and 6.

The ports 16 and 55 in the casing 10 may be in longitudinal alignment as shown in the drawing, while the port 58 is arranged toward one side and slightly inward (relative to the screw-plug 49) of port 55.

The ports 55 and 58 enter the cylinder or casing 10 at predetermined points intermediate of the inlet and outlet ports 13 and 16 and the screw-plug or closure member 49, in order that said ports 55 and 58 will be closed by the piston 30 while the circumferential groove 31, or the major portion of the tapered or diminishing portion 32 of the groove is in register with the inlet port 13, see Figures 3 and 4. The port 55, which is somewhat larger than ports 13 and 16, is disposed slightly nearer to the closure member 49 and therefore also to the adjacent end of the piston 30, than port 58, which supplies air to the alarm-sounding element or whistle 56; and the distance between the ports 13 and 16 and port 55, is slightly less than the distance between the outer or left hand end of the piston 30 and the circumferential shallow portion 32 of the air duct or groove in the piston, so that the port 55 will be uncovered before ports 13 and 16 are entirely shut off; the latter being minutely left open as shown in Figure 6. As a result of this relation, it is apparent that port 55 will be closed by the piston 30 until ports 13 and 16 are almost closed; a minute or fine portion of ports 13 and 16 being left uncovered by the piston when port 55 is entirely uncovered by the piston; at which time a minute portion of port 58 is being uncovered by the piston 30.

In operation, the user regulates the device to the degree of air pressure desired by rotating thumb piece 43 in proper direction, which causes screw member 37 to likewise rotate. As nut 38 is secured to sleeve 44 by set screw 48, nut 38 cannot rotate and therefore is caused to ride lengthwise of the screw 37 and sleeve 44 to move with it; thumb piece 43 being rotated until the forward beveled end of the sleeve 44 register with the degree of the graduations which designates the desired pressure. The nipple 11 is then attached to the tube or hose leading from the air supply and nozzle 14 is placed over the tire valve-stem with the teat 22 depressing the tire valve off its seat.

As the piston 30 is normally in the full open position shown in Figure 3, the air from the air supply will force check valve 28 off its seat and allow the air to pass through the deep circumferential groove or duct 31, into duct 15 and thence through the duct 50 in member 21 and out through the side ports 51 and into the tire. As the incoming air is under considerable pressure, the air will be discharged through ports 51 faster than it can flow through the tire valve. Although the piston is in close sliding relation with the casing, some air—in view of the pressure—will leak around the piston toward the rear end—namely to the left in Figure 3—through the grooves 52 and 53 in member 21 and the duct 55, because of the pressure at the delivery end of the nozzle 14. This results in the building up of pressure back of the piston 30 sufficiently to slightly move the latter against the pressure of spring 39, bringing the tapered portion 32 of the piston in alignment with incoming port 13, thereby decreasing the inflow to a degree substantially equal to the receiving capacity of the tire valve and hence continue inflation of the tire. That is to say the piston will have been moved during this period to the position shown in Figure 4. While the tire is being inflated and its air pressure approaches the preselected pressure determined by adjusting screw member 37, the seepage around the piston 30 from duct 55 is building up the pressure rearward of the piston, this pressure increasing as the increased pressure in the tire is obtained, causing the piston to move to the right in the figures, uncovering port 55, permitting freer inflow of air back of the piston and increasing the pressure sufficiently to overcome the spring pressure and causing further movement of piston 30 to the right as shown in Figures 5 and 6, where the inflowing or air admitting ports 13, 16 will be practically shut off except for a minute or hair-line opening as shown. The varying sizes and the relation between the ports 13, 16, 58 and the distance between the rear end of the piston and the base of the bevel on the piston, indicated at 33, is such that the movement of the piston as just described and as shown in Figures 5 and 6, will cause a minute uncovering of the whistle sounding port 58; a condition obtained after the regulated tension of the spring has been equaled and slightly overcome. This allows sufficient escape of the air to prevent further building up of pressure rearward of the piston, substantially equalizing the pressures on the piston, and preventing further movement of the piston to the right while at the same time giving an audible indication that the preselected air pressure for the tire has been reached.

It is apparent that with the piston 30 held in the position shown in Figures 5 and 6, the admission of air through the minute open portion of ports 13, 16 will off-set the discharge through the minute or small uncovering of port 58 and as a result piston 30 will be held in the position shown in Figure 5, with the result that a full uncovering of port 58 will not take place and hence "bleeding" of the tire pressure and of the air supply tank will not take place. After the whistle is sounding, the operator disconnects the hose from nipple 11 and check-valve 28 will prevent outflow from the tire through ports 16, 13 before the device is removed from the tire valve stem; the removal from the tire valve-stem causes the teat 22 to release the tire valve and allow it to return to its seat. As soon as the device has thus been disconnected, the spring 39 moves piston 30 back to normal position against plug-screw 49 with the ports 13 and 16 in register with circumferential duct 31, as shown in Figure 3.

It will be noted that the piston rod 34 normally extends slightly through the thumb piece 43. This enables the user to place his finger over the end of the stem so as to hold the piston in the normal position shown in Figure 3 and permit free passage of air through the device for quick inflation of the tire. As soon as the stem is released, however, the device will function as previously described and provide an audible indication that the preselected pressure to which the device is set has been obtained.

My improved device may be quickly assembled; the construction being such that the spring and piston can be easily removed and the respective parts cleaned.

The relation between the screw member 37, the nut 38 and the sleeve 44 is such that a half turn of thumb piece 43 will cause the thimble to advance one-fourth of a degree of the graduations 46 on the casing and thus set the device for two and a half pounds pressure; a complete turn of thumb-piece 43 advancing the sleeve a half degree or five pounds pressure; while two complete turns advance the sleeve a full degree, setting the device for ten pounds pressure. In order to determine these conditions, the thumb piece 43 is provided with an indicating mark as at 59 in Figure 1; this mark being so placed on thumb piece 43 that when it is in alignment with the graduations, the end of the sleeve will register with one of the graduations.

The function of teat 22 of member 21 is to hold the tire valve open and allow the air to pass into the tire with the least possible resistance. As the port 55 is covered by the piston during the initial operation, rapid outflow of air from the nozzle into the rear end of the casing 10 is impossible and the premature and too far forward movement of the piston prevented; the close fitting sliding relation between the piston and casing nevertheless permits enough air to leak to the rear of the piston sufficient to gradually move the latter forward to at least partially uncover the port 55 and provide practically the same pressure behind the piston as is intended to go into the tire. As a result, the partially advanced position of the piston as just described will be maintained against the pressure of spring 39 until the predetermined pressure for the tire has been obtained, at which time the pressure to the rear of the piston increases and further advances the piston to the point where the whistle port 58 is being uncovered.

The specific embodiment of the invention has been described in terms employed merely as terms of description and not as terms of limitation, as modifications may be made without, however, departing from the spirit of my invention.

What I claim is:

1. In an air pressure controller of the character described involving a closed ended casing provided with inlet and outlet ducts at opposite points in the sides of the casing, a pressure controlled piston slidable in said casing and provided with a circumferential air duct normally registering with the inlet and outlet ducts, said circumferential duct gradually diminishing in depth toward the rear end of the piston, a duct leading from the casing outlet duct to a point in the casing intermediate of the circumferential duct and the rear end of the piston when the latter is in normal position and normally closed by the piston, and an outlet port in the casing intermediate of said last mentioned duct and said inlet duct and normally closed by said piston, the relation of the distance between said port and the inlet duct and the distance between the rear end of the piston and its circumferential duct being such that initial uncovering of said port takes place before said inlet duct is completely closed.

2. In an air pressure controller of the character described comprising a casing provided with an inlet duct and an outlet duct at diametrically opposite points in the sides of the casing, a ported tire valve controlling member in the orifice of said outlet duct, a duct leading from said member to the interior of the rear end of the casing, an elongated piston slidable in the rear end of said casing and provided with a circumferential air passage in register with the inlet and the outlet ducts while the third mentioned duct is closed by the piston while in normal position, an outlet port in the side of the casing adjacent to said third mentioned duct and normally closed by said piston, the spacing between the inlet duct, the third mentioned duct and said outlet port and the distance between the rear end of the piston and the adjacent side of its circumferential air passage being so correlated that reduction of the air pressure admitted through the inlet duct through initial movement of the piston may be effected before the third duct is uncovered and further movement of the piston produced, partial opening of said outlet port being obtained before said inlet duct is closed.

3. In an air pressure controller of the character described comprising a cylindrical casing having closed ends and inlet and outlet ducts arranged diametrically opposite each other in the side walls, a ported tire-valve opening member arranged in said outlet duct, a third duct leading from the ports in said member to a point removed from one closed end of the casing and at a predetermined distance rearward of said inlet duct, an alarm sounding outlet port leading from the casing at a point intermediate of said third duct and said inlet duct, an elongated piston slidable in the casing and normally seated against one end of the casing, said piston at a predetermined point having a circumferential groove gradually decreasing in depth toward the rear end of the piston, the deep portion of said groove being normally in register with said inlet and the outlet ducts, with the length of the piston from the shallow side of the groove to the rear end of the piston being such that a minute uncovering of said alarm sounding outlet port occurs before the inlet duct is completely closed.

4. In an air pressure controller of the character described comprising a closed ended cylindrical casing provided adjacent to one end and at diametrically opposite points with an inlet duct and an outlet duct, an elongated piston in close sliding relation with the casing, the piston intermediate of its ends being provided with a circumferential groove gradually decreasing in depth toward the rear end of the piston with the deep portion of the groove normally registering with said ducts, an air duct leading from the outlet duct into the casing at a point where it is closed by the piston while the circumferential groove thereof is in register with said inlet duct, a ported tire valve controlling member intermediate of said outlet duct and said last mentioned air duct, an alarm sounding outlet port in the casing intermediate of said air duct, and the inlet duct so that the piston will begin uncovering the port as the inlet duct is about to be covered thereby.

5. In an air pressure controller of the character described, a closed ended tubular casing provided with pressure inlet and outlet ducts at diametrically opposite points, a spring pressed piston slidable in the casing and provided with a stem extending through one end of the casing, said piston having an air duct normally registering with the inlet and outlet ducts and diminishing toward the rear end of the piston, a duct connecting said outlet duct with the casing at a point forward of the rear end of the piston and normally closed thereby, an alarm sounding outlet port in the casing at a point intermediate of the last mentioned duct and the inlet duct, a hollow screw in the opposite end of the casing provided with a traveling member, means at the end of the casing for controlling said screw whereby the traveling member is moved longitudinally of the casing and the piston spring placed under varying degrees of pressure, and a sleeve slidably mounted on the casing and controlled by said traveling member whereby the degree of spring pressure may be determined.

6. An air pressure controller of the character described, comprising a tubular casing closed at its ends, a nipple and a nozzle extending opposite each other from the casing and containing, respectively, a pressure inlet duct and a pressure outlet duct, a ported tire valve engaging member mounted in the outlet duct, a spring pressed piston in the casing having a stem extending through one end of the casing and provided with a duct registering with said inlet and outlet ducts when the piston is in normal condition, said piston duct gradually diminishing in depth toward the rear end of the piston, a duct in the nozzle leading from said outlet duct into the casing at a point intermediate of the rear end of the piston and its duct when the piston is in normal position, and an alarm sounding outlet port in the casing at a predetermined point forward of said last mentioned duct.

7. A tire inflating air pressure controller of the character described comprising an elongated casing having closed ends, an inlet nipple and a discharge nozzle diametrically opposite each other adjacent one end of the casing, an elongated piston slidable in the casing, normally abutting against an end wall of the casing, and provided with a port normally registering with the openings in the nipple and in the nozzle, the capacity of said port gradually decreasing toward the end of the piston contacting with the casing end wall, an air passage leading from the nozzle into the casing at a point forward of the normal position of said piston-end, and an alarm sounding discharge port in the casing forward of said last mentioned air passage and spaced a predetermined distance rearward of the nipple opening so that forward movement of the piston after uncovering said air passage will slightly open said discharge port before closing the inlet nipple opening, whereby air admitted will equal the amount discharging through said discharge port and the tire pressure maintained.

8. A tire inflating air pressure controller of the character described comprising an elongated casing, removable closure members for both ends of the casing, an inlet nipple on the casing adjacent to one end, an outlet nozzle on the casing diametrically opposite to said nipple, an elongated piston slidable in the casing and provided with a circumferential groove in register with the openings of said nipple and said nozzle when the rear end of the piston is seated against one of said closure members, said groove gradually diminishing in depth toward said rear end of the piston, a port leading from the nozzle into the casing at a point intermediate of said piston-end and its groove and normally closed by said piston, a ported tire-valve controlling member in the orifice of the nozzle, an alarm sounding element secured to the casing, a discharge port leading from the casing at a predetermined point to said element, the relation between both of said ports, the inlet nipple and the distance from the rear end of the piston to its groove being such that after predetermined movements of the piston said first mentioned port will be uncovered when the shallow portion of the piston groove registers with the nipple and a portion of the second mentioned port will be uncovered before complete closure of the inlet nipple, and a piston-rod disposed through the closure member at one end of the casing whereby the piston may be held against movement.

9. A tire inflating air pressure controller of the character described comprising an elongated casing having a closed end, an inlet nipple and a discharge nozzle disposed outwardly from the sides of the casing, an elongated piston slidable in the casing normally abutting against said end wall of the casing and provided with a port normally registering with the openings in the nipple and in the nozzle, the capacity of said port gradually decreasing toward the end of the piston contacting with said end wall, an air passage leading from the nozzle into the casing forward of the end of the piston engaging said end wall, a discharge port in the casing forward of said last mentioned air passage and spaced a predetermined distance rearward of the nipple opening so that forward movement of the piston after uncovering said air passage will open said discharge port before closing the inlet nipple opening, and means whereby said piston may be held against movement.

MICHAEL J. McANENY.